United States Patent
Leistner et al.

(10) Patent No.: US 7,055,920 B2
(45) Date of Patent: Jun. 6, 2006

(54) REFRIGERATOR CABINET BREAKER ASSEMBLY

(75) Inventors: David W. Leistner, Sidney, OH (US); Richard D. Roberts, Sidney, OH (US)

(73) Assignee: Thetford Corporation, Ann Arbor, MI (US)

( * ) Notice: Subject to any disclaimer, the term of this patent is extended or adjusted under 35 U.S.C. 154(b) by 156 days.

(21) Appl. No.: 10/493,360

(22) PCT Filed: Oct. 21, 2002

(86) PCT No.: PCT/US02/33554

§ 371 (c)(1),
(2), (4) Date: Oct. 21, 2004

(87) PCT Pub. No.: WO03/036201

PCT Pub. Date: May 1, 2003

(65) Prior Publication Data

US 2005/0040747 A1 Feb. 24, 2005

Related U.S. Application Data

(60) Provisional application No. 60/351,657, filed on Oct. 25, 2001.

(51) Int. Cl.
*A47B 96/04* (2006.01)

(52) U.S. Cl. .............................. 312/406.2; 220/592.06
(58) Field of Classification Search ............. 312/406.2, 312/406.1, 406, 263; 52/656.9, 665, 456, 52/656.8; 220/592.06, 592.08
See application file for complete search history.

(56) References Cited

U.S. PATENT DOCUMENTS

| 2,576,208 | A | | 1/1951 | Benson |
| 2,544,321 | A | * | 3/1951 | Iwashita ................ 220/592.08 |
| 3,627,165 | A | * | 12/1971 | Cobb .................... 220/592.08 |
| 3,632,012 | A | | 1/1972 | Kitson |
| 3,707,243 | A | | 12/1972 | Kitson |
| 3,768,687 | A | * | 10/1973 | Spencer ................ 220/592.06 |
| 4,134,626 | A | | 1/1979 | Kordes |
| 4,134,627 | A | * | 1/1979 | Kuskowski .............. 312/406.2 |
| 5,284,023 | A | * | 2/1994 | Silva et al. .................. 312/236 |
| 5,368,381 | A | * | 11/1994 | Mandel ................... 312/406.2 |
| 5,520,453 | A | * | 5/1996 | Aoki et al. ................. 312/406 |
| 5,584,551 | A | * | 12/1996 | Jenkins ....................... 312/401 |
| 5,720,536 | A | * | 2/1998 | Jenkins et al. ........... 312/406.2 |

FOREIGN PATENT DOCUMENTS

| CA | 1110151 | * | 10/1981 |
| GB | 1098447 | * | 11/1965 |

OTHER PUBLICATIONS

International Search Report for PCT/US02/33554; ISA/210 US; Mailed: May 20, 2003.

* cited by examiner

*Primary Examiner*—Hanh V. Tran
(74) *Attorney, Agent, or Firm*—Harness, Dickey & Pierce, P.L.C.

(57) ABSTRACT

A refrigerator cabinet includes an interior liner, an exterior cabinet and a breaker assembly. The breaker assembly connects the interior liner and the exterior cabinet and maintains a space therebetween. The breaker assembly includes a first breaker strip. The first breaker strip has a forward leg, a side leg, and a clip portion. The side leg extends from the forward leg and is oriented substantially perpendicular to the forward leg. The clip portion is carried by the forward leg. An adjacent side surface of the exterior cabinet is defined by a sheet of cardboard. The cardboard is captured between the side leg and the clip portion.

21 Claims, 3 Drawing Sheets

REFRIGERATOR CABINET BREAKER ASSEMBLY

This application claims the benefit of provisional application 60/351,657 filed Oct. 25, 2001.

FIELD OF THE INVENTION

The present invention generally relates to refrigerators. More particularly, the present invention relates to a breaker assembly for a refrigerator cabinet.

BACKGROUND OF THE INVENTION

Vehicles, including but not limited to recreational vehicles ("RVs"), tractor trailers, airplanes, boats, trains, and the like often incorporate refrigerators for the comfort and convenience of the occupants. Such refrigerators conventionally include an exterior cabinet and an interior liner. The interior liner is spaced from the exterior cabinet. Insulation material is inserted into this space. A breaker is used to maintain a proper spacing between the interior liner and the exterior cabinet.

Conventional breakers are constructed of metal and utilized to interconnect the front faces of the interior liner and the exterior cabinet. Known breakers for vehicle refrigerators are typically formed to engage flanges on the liner and the exterior cabinet. The breaker assists in holding the interior liner and the exterior cabinet in a spaced relationship until insulating material can be placed therebetween and cured while the cabinet is in a fixture. The breaker also functions to define a contact surface for a magnetic gasket carried by the door.

While known breakers have proven to be satisfactory for their intended purposes of maintain a proper spacing between the exterior cabinet and the inner liner and defining a contact surface for a magnetic gasket, they are all associated with limitations. For example, cabinets for vehicle refrigerators typically include top, bottom and side breaker strips each having a side that extends completely across an adjacent surface of the cabinet.

Accordingly, it remains a need in the pertinent art to provide a breaker assembly for a refrigerator cabinet that overcomes the limitations associated with the prior known arrangements, including but not limited to those disadvantages discussed above.

SUMMARY OF THE INVENTION

It is a general object of the present invention to provide a refrigerator cabinet having a breaker assembly that requires a reduced amount of metal and is correspondingly lighter in weight.

In one particular form, the present invention provides a refrigerator cabinet including an interior liner, an exterior cabinet and a breaker assembly. The breaker assembly connects the interior liner and the exterior cabinet and maintains a space therebetween. The breaker assembly includes a first breaker strip. The first breaker strip has a forward leg, a side leg, and a clip. The side leg extends from the forward leg and is oriented substantially perpendicular to the forward leg. The clip portion is carried by the forward leg. An adjacent side surface of the cabinet is defined by a sheet of cardboard. An edge of the cardboard is captured between the side leg and the clip.

In another particular form, the present invention provides a method of manufacturing a refrigerator cabinet for a motor vehicle. The refrigerator cabinet has an interior liner and an exterior cabinet. The method includes the step of inserting the interior liner to the exterior cabinet to define a space therebetween. The method additionally includes the step of providing a breaker assembly for connecting the interior liner and exterior cabinet and maintaining the space. The breaker assembly includes a breaker strip having a forward leg, a side leg extending from the forward leg and oriented substantially perpendicular to the forward leg and a clip portion carried by the forward leg. The method further includes the steps of engaging a portion of the interior liner with the clip portion and capturing an edge of an adjacent side of the cabinet between the clip portion and the side leg.

Additional advantages and features of the present invention will become apparent from the following description and appended claims, taken in conjunction with the accompanying drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
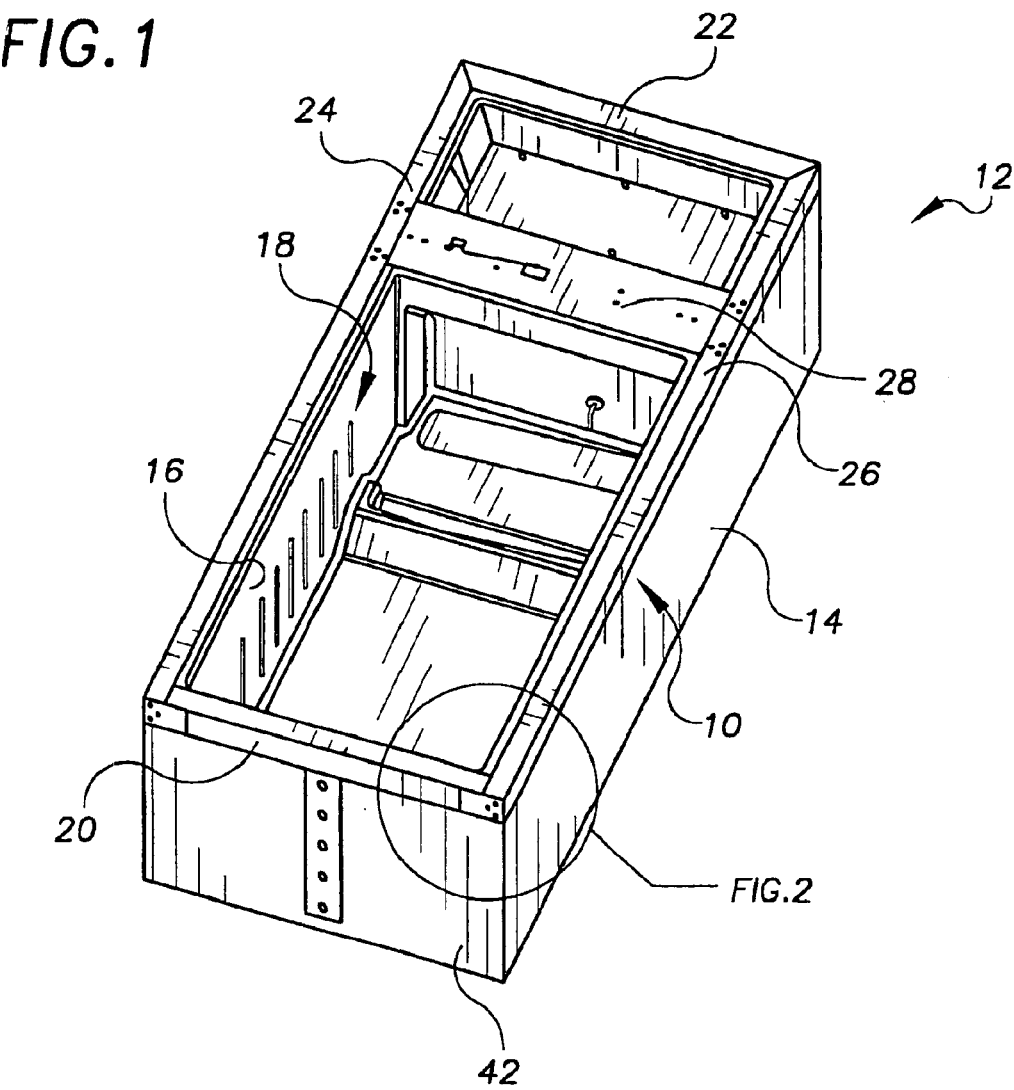
FIG. 1 is a perspective view of a cabinet of a refrigerator incorporating a breaker assembly constructed in accordance with the teachings of a preferred embodiment of the present invention.
Figure 2:
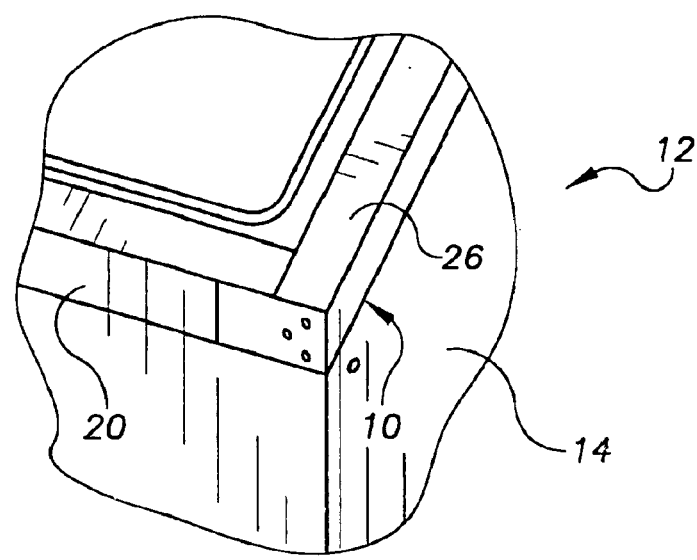
FIG. 2 is an enlarged view of the detail shown in circle 2 in FIG. 1.
Figure 3:
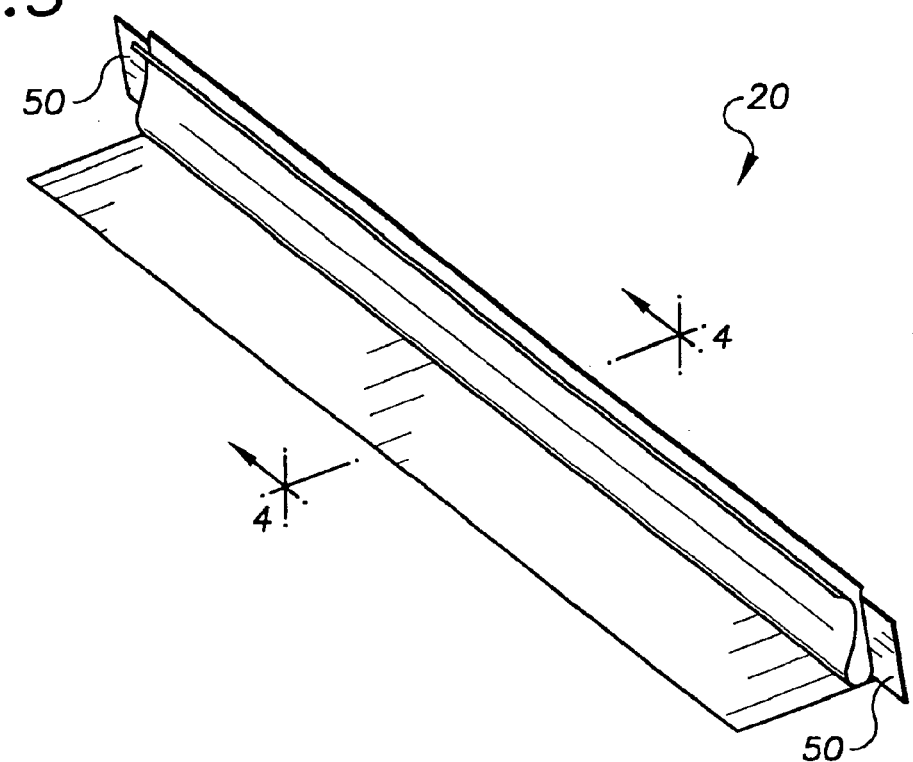
FIG. 3 is an enlarged perspective view of a first or bottom breaker strip of the breaker assembly of the present invention.

With initial reference to FIGS. 1 and 2, a breaker assembly for a refrigerator constructed in accordance with the teachings of a preferred embodiment of the present invention is illustrated and generally identified at reference character 10. The breaker assembly 10 is shown incorporated into a particular refrigerator 12. The refrigerator 12 will be understood to be merely exemplary. In this regard, it will become apparent to those skilled in the art that the teachings of the present invention are not limited to any particular refrigerator. However, the teachings of the present invention are particularly adapted for vehicle refrigerators.

Prior to addressing the specifics of the breaker assembly 10 of the present invention, a brief understanding of the remainder of the refrigerator 12 is warranted. The refrigerator 12 is illustrated to generally include an exterior cabinet 14 and an interior liner 16. The liner 16 is received within the exterior cabinet 14 and defines a storage compartment 18. In the particular embodiment shown in the drawings, the interior liner 16 defines a lower refrigerator compartment and an upper freezer compartment.

While not specifically shown in the drawings, it will be understood that a space or cavity is conventionally defined between the cabinet 14 and the liner 16. Insulation is introduced into the cavity in a liquid form. While the cabinet 14 is in a reinforcing fixture, the liquid insulation is cured through an exothermic reaction into a foam. The breaker assembly 10 of the present invention operates to maintain proper spacing between the cabinet 14 and the liner 16 prior to the curing of the insulation and defines a contact surface for a magnetic gasket (not shown) carried by a door (not shown).

With continued reference to FIGS. 1 and 2 and additional reference to FIGS. 3 through 7, the breaker assembly 10 of the present invention will be further described. The breaker assembly 10 is illustrated to generally include a bottom breaker strip 20, an upper breaker side 22 and a pair of spaced apart lateral side breaker strips 24 and 26. The breaker assembly 10 further includes a central breaker strip 28. Insofar as the present invention is concerned, the central breaker strip 28 is conventional in construction.

In the embodiment illustrated, the upper and side breaker strips 22, 24 and 26 are formed from a common sheet of metal. After forming, this common sheet of metal is bent in two places to define intersections between a first lateral side breaker strip 24 and the upper breaker strip 22 and also between a second lateral side breaker strip 26 and the upper breaker strip 22. The upper and side breaker strips 22, 24, and 26 will be understood to have a cross-section which is substantially identical to that of the bottom breaker strip 20 (as shown particularly in FIG. 4).

In large part, the subject invention is directed to the configuration of the breaker strips 20–26 and the manner in which the breaker strips 20–26 engage adjacent sides of the exterior cabinet 14. The subject invention also relates to a method of manufacturing a refrigerator. As a result of the common cross-section shared by the breaker strips 20–26, most of the remainder of this detailed description is directed to the bottom breaker strip 20 and its interconnection to the liner 16 and exterior cabinet 14. It will be understood that the remaining breaker strips 22–26 similarly engage the exterior cabinet 14.

The bottom breaker strip 20 includes a forward leg 30 and a side leg 32. The side leg 32 extends from the forward leg 30 and is oriented substantially parallel to the forward leg 30. In one application, the side leg has a depth D of approximately 45 mm.

The bottom breaker strip 20 is formed to additionally include a clip or clip portion 34. In the preferred embodiment, the clip portion 34 is carried by the forward leg 30. The clip portion 34, forward leg 30 and side leg 32 are preferably formed of a single sheet of metal. An upper edge 36 of the forward leg 30 is rolled over and transitions to the clip portion 34. The clip portion 34 defines an opening 38 for receiving a flange 40 of the liner 16. The liner 16 is received in the direction of arrow A (shown in FIG. 4).

Figure 4:
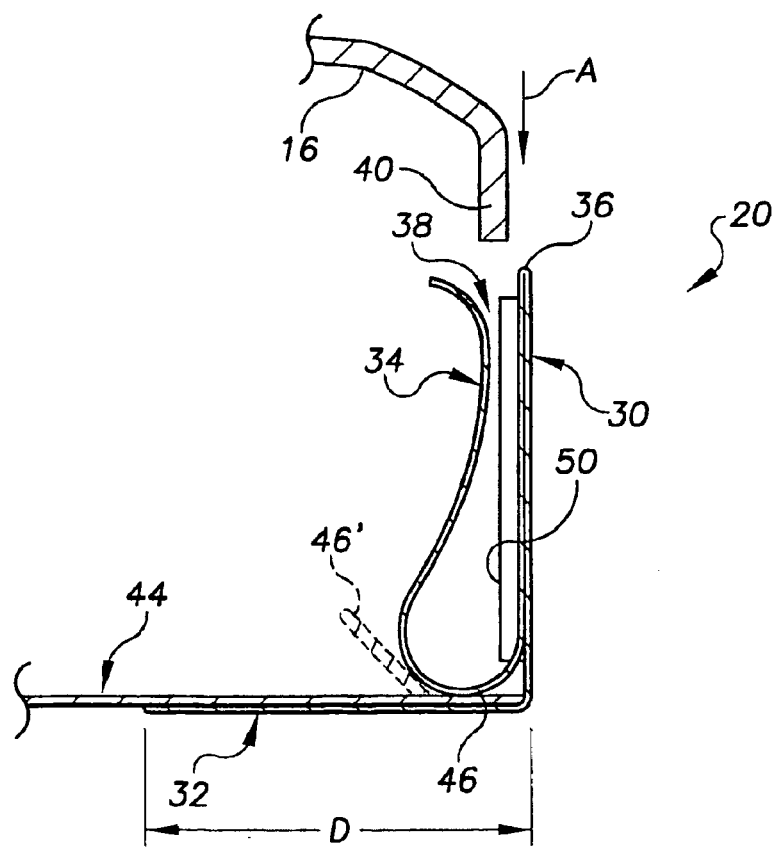
FIG. 4 is a cross-sectional view taken along the line 4—4 of FIG. 3, the first breaker strip shown operatively associated with a portion of a liner.
Figure 5:
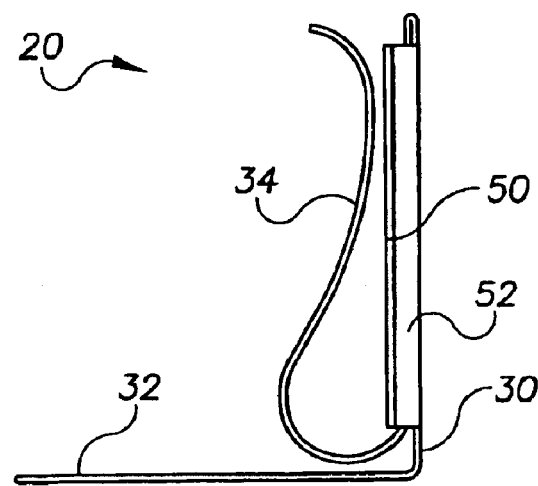
FIG. 5 is an end view of the first breaker strip of FIG. 3.

A surface 42 of the cabinet 14 adjacent the bottom breaker 20 (i.e., the bottom surface) is defined by a sheet of cardboard 44. The sheet of cardboard 44 is preferably foil-coated. An edge 46 of the cardboard sheet 44 is captured between the clip portion 34 and the side leg 32. An alternate arrangement is shown in FIG. 4 in phantom lines in which the edge 46' of the cardboard sheet 44 is folded over and introduced between the clip portion 34 and the side leg 32. With particular reference to the cross-sectional view of FIG. 4, the insulation is introduced in liquid form between the liner 16 and the sheet of cardboard 44.

The bottom breaker strip 20 of the present invention is illustrated to further include a pair of tabs 50 that laterally extend from the opposed ends of the forward leg 30. The tabs 50 are generally parallel to but stepped rearwardly from the forward leg 30. In the preferred embodiment, the tabs 50 are integrally formed with the forward leg 30 and are connected through a stepped segment 52.

Figure 6:
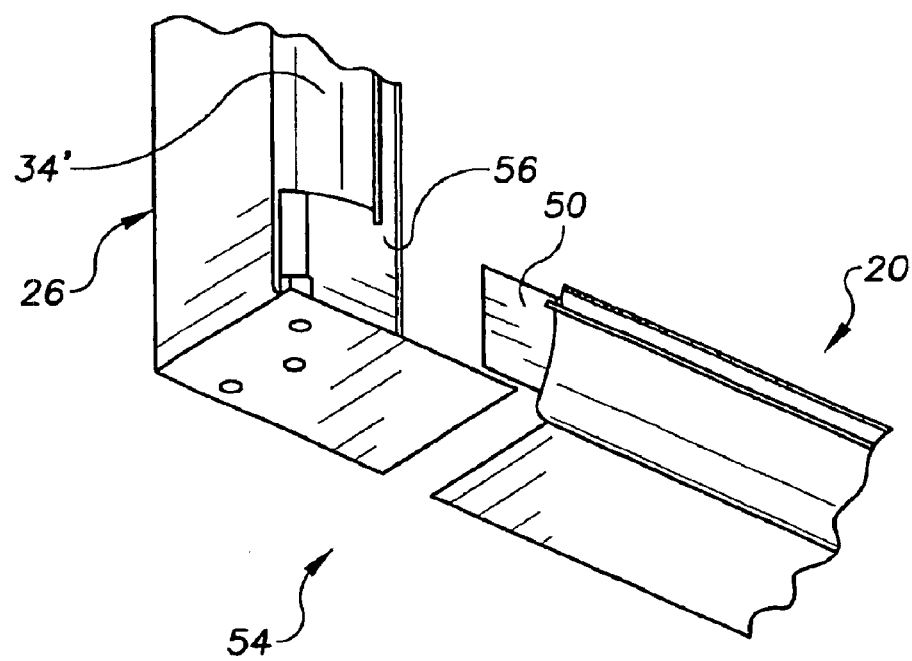
FIG. 6 is an exploded perspective view of a joint between the first breaker strip and a second or lateral side breaker strip.

The tabs 50 cooperate with adjacent ends of the lateral side breaker strips 24 and 26 to define a pair of joints 54 (one of which is specifically shown in FIG. 6). A forward side of the tabs 50 abuts a rear side of a forward face 56 of a corresponding one of the sides 24 and 26 of the primary breaker strip 21. The clip portion 34' of the adjacent lateral side breaker 26 is partially cut away to accommodate the tab 50. In this manner, a joint 54 having flush forward legs 30 and 56 is defined.

As discussed above, the upper and lateral side breaker strips 22–26 engage an adjacent side of the exterior cabinet 14 in an identical manner. Similar to the bottom side 42, the remaining sides are foil-coated cardboard. As with the bottom side breaker strip 20, the side legs of the remaining breaker strips 22–24 extend only approximately 45 mm from the corresponding forward side.

The particular arrangement of the present invention is well suit to eliminate leak paths which may otherwise allow the liquid form of the insulation to seep from the cavity between the exterior cabinet 14 and the interior liner 16 prior to exothermic curing. Furthermore, the subject design eliminates a substantial amount of metal and a corresponding amount of weight as compared to the prior art.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A refrigerator cabinet comprising:
    an interior liner;
    an exterior cabinet; and
    a breaker assembly connecting a portion of the interior liner and a portion of the exterior cabinet and maintaining a space therebetween, the breaker assembly having a first breaker strip, the first breaker strip including:
        a forward leg;
        a side leg extending from the forward leg and oriented substantially perpendicular to the forward leg;
        a clip portion carried by the forward leg; and
    a laterally extending tab depending from the forward leg of the first breaker strip, the tab being parallel to but offset from the forward leg of the first breaker strip;
    wherein an adjacent side surface of the exterior cabinet is defined by a sheet, the sheet having an edge captured between the side leg and the clip portion.

2. The breaker for a refrigerator cabinet of claim 1, wherein the edge of the sheet is folded over.

3. The breaker for a refrigerator cabinet of claim 1, further comprising a foam disposed in the space.

4. The breaker for a refrigerator cabinet of claim 1, wherein the forward leg, the side leg, and the clip portion are formed from a common sheet of metal.

5. The breaker for a refrigerator cabinet of claim 1, wherein the breaker assembly further includes a second breaker strip having a forward leg and a side leg, the second breaker strip and the first breaker strip intersecting at a joint.

6. The breaker for a refrigerator cabinet of claim 1, wherein the tab abuts a rear surface of the forward leg of the second breaker strip.

7. The breaker for a refrigerator cabinet of claim 1, wherein the first breaker strip is a bottom breaker strip and the adjacent side surface is a bottom surface.

8. The breaker for a refrigerator cabinet of claim 5, wherein the first breaker strip is a bottom breaker strip, the adjacent side surface is a bottom surface, and the second breaker strip is a lateral side breaker strip.

9. A method of manufacturing a refrigerator cabinet having an interior liner and an exterior cabinet, the method comprising the steps of:
inserting the interior liner into the exterior cabinet to define a space therebetween;
providing a breaker assembly for connecting the interior liner and the exterior cabinet and maintaining the space, the breaker assembly including a breaker strip having a forward leg, a side leg extending from the forward leg and oriented substantially perpendicular to the forward leg, and a clip portion carried by the forward leg; and
engaging a portion of the interior liner with the clip portion; and
capturing an edge of an adjacent side of the cabinet between the clip portion and the side leg.

10. The method of claim 9, further comprising the step of introducing a foam into the space.

11. A breaker assembly for a refrigerator having an interior liner and an exterior cabinet, the breaker assembly for connecting a portion of the interior liner and a portion of the exterior cabinet and maintaining a space therebetween, the breaker assembly comprising:
a first breaker strip, the first breaker strip including:
a forward leg;
a side leg extending from the forward leg and oriented substantially perpendicular to the forward leg; and
a clip portion integrally formed to include a first portion, a second portion and intermediate portion connecting the first and second portions, the first and second portions spaced apart to define an opening configured to receive the interior liner, the second portion carried by the forward leg;
the side leg and the intermediate portion of the clip portion defines means for capturing an edge of a planar member of an adjacent side surface of the exterior cabinet.

12. The breaker assembly for a refrigerator of claim 11, wherein the first breaker strip is a bottom breaker strip and the adjacent side surface is a bottom surface.

13. The breaker assembly for a refrigerator of claim 11, wherein the clip portion is integrally formed with the side leg.

14. The breaker for a refrigerator cabinet of claim 11, further comprising a foam disposed in the space.

15. The breaker for a refrigerator cabinet of claim 11, wherein the forward leg, the side leg, and the clip portion are formed from a common sheet of metal.

16. The breaker for a refrigerator cabinet of claim 11, wherein the breaker assembly further includes a second breaker strip having a forward leg and a side leg, the second breaker strip and the first breaker strip intersecting at a joint.

17. The breaker for a refrigerator cabinet of claim 11, wherein the first breaker strip is a bottom breaker strip, the adjacent side surface is a bottom surface, and the second breaker strip is a lateral side breaker strip.

18. The breaker for a refrigerator cabinet of claim 11, in combination with a refrigerator.

19. The breaker assembly for a refrigerator of claim 11, wherein the planar member is a sheet of cardboard.

20. The breaker for a refrigerator cabinet of claim 19, wherein the edge of the sheet is folded over.

21. The breaker for a refrigerator of claim 11, wherein the means for capturing and edge of a planar member includes a gap.

* * * * *